United States Patent

Wyatt

[15] 3,698,661
[45] Oct. 17, 1972

[54] CONTROLLABLE HYSTERESIS DAMPING

[72] Inventor: Theodore Wyatt, Union Bridge, Md.

[73] Assignee: The United States of America as represented by the Secretary of the Navy

[22] Filed: Oct. 7, 1970

[21] Appl. No.: 78,772

[52] U.S. Cl. .............................. 244/1 AS, 336/155
[51] Int. Cl. .................................. B64c, H01f 21/08
[58] Field of Search ...... 244/1 SA, 1 SS, 1 R; 310/93; 335/284, 227, 209, 243; 336/221, 174, 155, 175

[56] References Cited

UNITED STATES PATENTS

| | | | |
|---|---|---|---|
| 3,497,160 | 2/1970 | Mobley | 310/93 |
| 2,953,739 | 9/1960 | Duinker | 336/155 |
| 3,114,518 | 12/1963 | Fischell | 335/209 |

Primary Examiner—Richard E. Aegerter
Attorney—Richard S. Sciascia and J. A. Cooke

[57] ABSTRACT

The invention relates generally to spacecraft attitude stabilization in which magnetic hysteresis damping rods are employed to damp rapid or relatively large oscillations of a spacecraft. In particular, the invention provides a method and means for inducing a local magnetic field within the damping rods after substantial damping of the large oscillations in order to reduce the effect of the earth's magnetic field on the rods, thus eliminating persistent low-order oscillations of the spacecraft due to continuing dipole interaction of the rods with the magnetic field of the earth. According to one embodiment of the invention, electrically conductive coils disposed around a magnetically permeable hysteresis damping rod are electrically energized, thus inducing within the rod a local magnetic field of sufficient magnitude such that the earth's field produces only a slight and substantially invariant magnetic induction in the rods.

15 Claims, 10 Drawing Figures

INVENTOR.
THEODORE WYATT
BY J.O. Tresansky
ATTORNEY

INVENTOR.
THEODORE WYATT

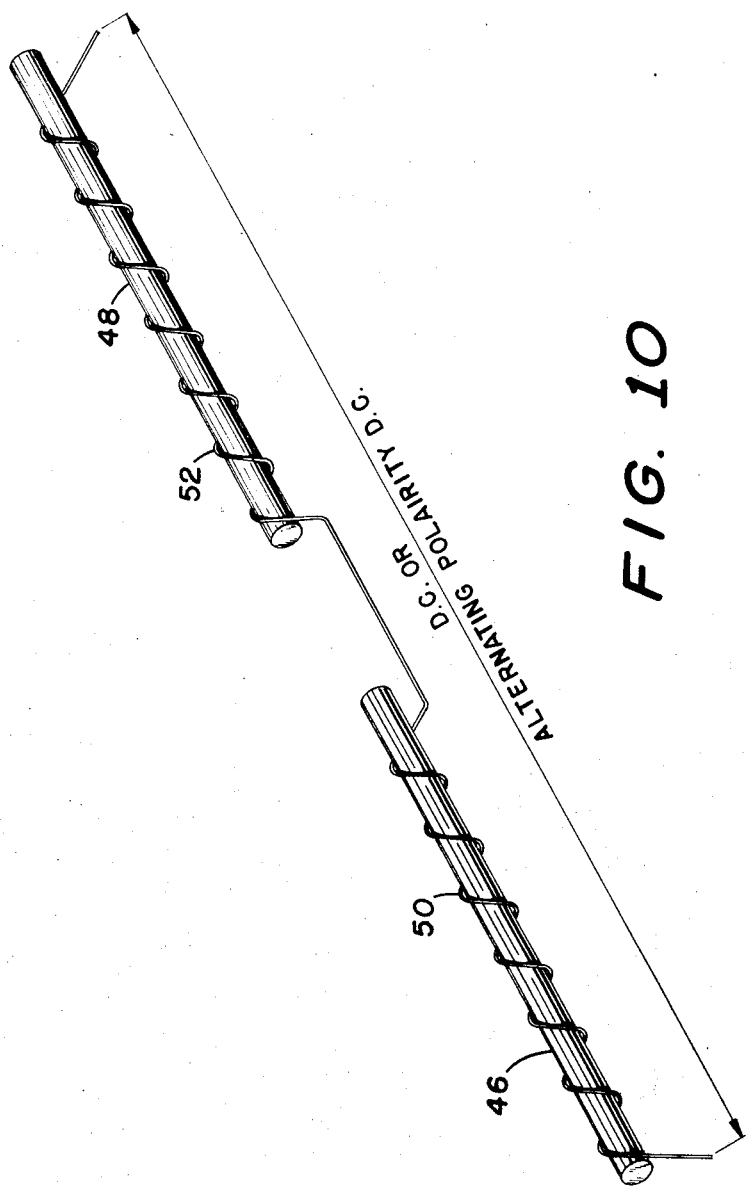

CONTROLLABLE HYSTERESIS DAMPING

BACKGROUND AND SUMMARY OF THE INVENTION

Control of satellite motion is accomplished by reaction to an exerted force. In the environment of a satellite, some entity must be chosen against which that force may be exerted. Although several media, such as gas molecules, photons, or the earth's gravitational field, are available, to be acted against, in the environment of an earth satellite the relatively large force that can be exerted on the satellite through use of the earth's magnetic field causes this media to be one of the most feasible means for motional control.

Attitude stabilization of the final stage of rocket propulsion during orbital injection is frequently accomplished by spinning the rocket stage and attached satellite about the thrust axis during launch. Since the frequency of radio transmission from an orbiting satellite is modulated by the spin rate of the satellite, this motion must be removed from orbiting vehicles which require a high order of frequency stability. In order to remove these disruptive satellite motions, various damping systems have been provided. The magnetic hysteresis loss of ferromagnetic materials has been found to be a useful process for damping the angular motions of earth satellites. The principle of hysteresis damping is the conversion of kinetic energy into thermal energy which occurs when the magnetizing force applied to a ferromagnetic material is alternately increased and reduced by the motion which is to be damped. The magnetizing force employed is the natural field of the earth. The damping provisions in the satellites consist of orthogonally-oriented rods of an iron alloy selected for very "lossy" magnetic hysteresis properties. Presently magnetic hysteresis loss damping is employed to damp the spin stabilization or tip-off motions of satellites resulting from launching into orbit, and the oscillations of satellites stabilized in attitude by magnetic or gravity gradient torques.

The invention provides a method and means for utilizing the beneficial characteristics of magnetic hysteresis loss in damping rapid or large amplitude motions, while at the same time reducing the undesirably large residual oscillations in the final stage of damping. The invention relates to selective alteration of the character of magnetic hysteresis damping rods, particularly for gravity gradient stabilized satellites. One embodiment of the present method involves applying to each rod an electrically induced magnetizing force sufficiently larger than the maximum component of the earth's field experienced in orbit so that the variations in the earth's total field intensity and dip angle produce negligibly small variations in the induced magnetism, and hence dipole moment, of the rods. Obviously, it is necessary that the artificially induced magnetism in the rods be produced in a way so that no net dipole is created which would produce a disturbing torque on the satellite.

Accordingly, it is the primary object of the invention to provide a method and means for reducing or eliminating the undesirably large residual oscillations usually present in the final phases of hysteresis damping.

It is also an object of the invention to provide controllable hysteresis damping of a satellite by selectively altering the hysteresis capability of hysteresis material on board the satellite.

It is another object of the invention to provide a large local magnetic field in the damping system so that variations in the magnetizing force of the earth's field ($\Delta H$) produce small changes in the magnetic induction ($\Delta B$) acting in the system.

DESCRIPTION OF THE PREFERRED EMBODIMENTS

Figure 1:
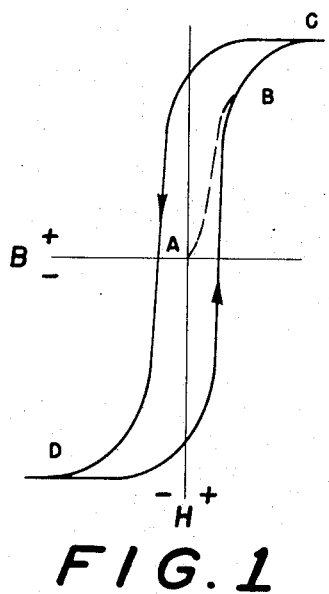
FIG. 1 is a diagram illustrating the "hysteresis loop" of a material in which a magnetizing force, H, is increased from zero to saturation, subsequently reduced to zero, increased thereafter to saturation with opposite polarity, reduced again to zero, and finally restored to saturation with the initial polarity.

The effect on a rod rotating in the earth's magnetic field has been previously described in the art. As the rod rotates, it experiences a magnetic field along its length which varies sinusoidally at the rate of spin and with a peak amplitude equal to the intensity of the earth's magnetic field normal to the axis of spin. As the magnetic rod undergoes changes in the magnetic field, it traverses its "hysteresis loop." FIG. 1 diagrammatically illustrates the property of magnetic hysteresis. The diagram is a plot of the magnetizing force, H, to which a rod or other magnetically permeable material is subjected and the resulting magnetic induction, B, produced within a rod.

If a test were initiated with zero magnetizing force and an initially unmagnetized rod, the condition would correspond to point A on FIG. 1. As the magnetizing force is gradually increased with a polarity arbitrarily designated "+," the magnetic induction increases, slowly at first and then more rapidly to point B. Further increases in magnetizing force result in constantly decreasing gains in magnetic induction. Finally a condition known as saturation induction, point C, is attained wherein further increases in magnetizing force result in no further increase in magnetic induction.

If the magnetizing force is then gradually reduced, the induction also decreases, but proportionally less than the force decreases. As the magnetizing force is continuously decreased to zero and then increased in the "−" direction, the induction reverses polarity. With sufficient increase of the induction toward "−" the saturation induction is again attained (point D). Change of the magnetizing force back in the "+" sense gradually reduces and eventually reverses magnetic induction. After the point of intersection with the original magnetization cruve is reached (point B) the initial curve is retracted. Repetition of the entire process repeatedly follows the path of the solid line.

It is significant that, as the magnetizing force, H, approaches the saturation value, the incremental permeability $\Delta B/\Delta H$ becomes vanishingly small. The present invention utilizes this natural phenomenon by providing a large local magnetic field so that variations in the magnetizing force of the earth's field ($\Delta H$) produce small changes in the magnetic induction ($\Delta B$).

Ordinarily damping rods are constructed of a ferromagnetic material capable of magnetic induction sufficiently high that the comparatively weak field of the earth does not produce saturation. Consequently, if a satellite is spinning or tumbling in orbit, with with a rate of rotation rapid compared to the orbital motion, magnetic hysteresis rods disposed with their long axes normal to the spin axis and alternately pointing in approximately north and south directions will undergo cyclic variations in magnetic induction of the nature shown by a solid line in FIG. 2, the saturation curve being shown in phantom. The area enclosed by the solid line is a measure of the amount of kinetic energy converted to thermal energy in each revolution. Since the rotational kinetic energy is reduced by each revolution, the rotation rate is gradually reduced, finally becoming relatively small.

Figure 3:
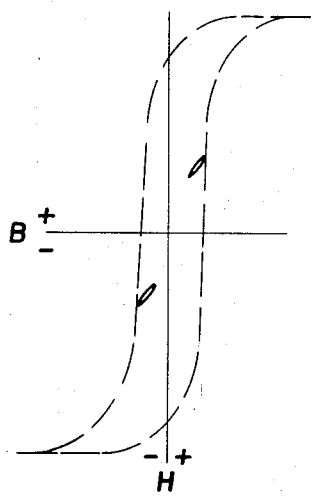
FIG. 3 is a diagram illustrating the continuing interaction between the rods and the earth's magnetic field after damping of large oscillatory motion of the satellite.

In the usual case the spinning or tumbling is gradually damped to the point that the angular motion becomes an oscillation of less than 180° peak-to-peak, opposed by the restoring torque of an attitude stabilization process, such as magnetic or gravity gradient attitude control. Because of the smaller amplitude of angular motion the rods cannot reverse magnetic orientation end-for-end in a usual satellite configuration, except perhaps in the vicinity of the earth's magnetic poles where the field lines are nearly vertical. Consequently, as the satellite traverses the orbit the magnetizing force experienced by the rods may vary through a range of "+" values or of "−" values without changing sign. Then the hysteresis loop will have the general nature of either of the two loops shown as solid lines in FIG. 3.

From the foregoing, two observations are evident. The first is that as damping proceeds to smaller oscillations the damping process becomes less effective, or more gentle, as evidenced by the gradual reduction in the area of the hysteresis loop, whereas damping is more vigorous when motions are large in amplitude and rapid in rate. Intuitively, it may seem that this natural progression in damping characteristic is advantageous.

Figure 2:
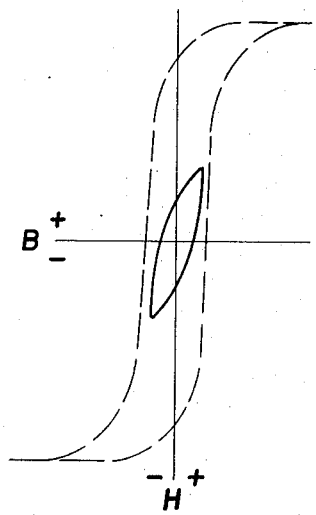
FIG. 2 is a diagram illustrating the cyclic variations in magnetic induction, B, produced in a magnetic hysteresis rod in a spinning satellite, wherein the rods have their long axes normal to the spin axis of the satellite and wherein the rods alternately point in approximately north and south directions.

The second observation is that, as the motions become progressively smaller, the average magnetic dipole moment of the ferromagnetic material becomes substantially different from the character exhibited during rapid motions of large amplitude. If the motion produces end-over-end orientation of a damping rod with respect to the earth's magnetic field, then polarity reversals of equal magnitude occur as shown in FIG. 2. The magnetic dipole of a hysteresis damping rod is proportional to the magnetic induction of the rod. The trace of magnetic induction versus magnetizing force follows a symmetric pattern centered about zero in this case and, consequently, the average magnetic dipole is zero. As long as the period of complete induction reversals is brief compared to the natural period of angular motion of the satellite, the instantaneous magnetic moment of the rod has no effect on the attitude of the satellite and provides only the desired damping. However, as damping progresses and the trace of induction assumes the character of FIG. 3, the dipole moment of the rod becomes an average value other than zero and with a polarity causing attraction to the local field of the earth, that is, each rod attempts to align itself in magnetic attitude orientation. If the plane of the orbit of the satellite is inclined with respect to the magnetic equator of the earth (a practical necessity since the plane of the magnetic equator is not fixed in inertial space), the satellite in its orbit passes through varying magnetic dip angles. The magnitude of the dip angle variations is a function of the orbital inclination, being maximum for a polar orbit.

The combination of a net magnetic moment in a satellite and a varying magnetic dip angle around the orbital path produces a changing torque which perturbs the attitude of the satellite. This continual attitude disturbance is particularly noticeable in satellites which are stabilized by the so-called gravity gradient effect. The gravity gradient stabilizing torque is comparatively weak in practical satellite configurations and is particularly ill-conditioned to the control of small attitude variations since the restoring torque varies as the sine of twice the angle off vertical. Hysteresis damping rods, which are normally deployed orthogonally to the gravity gradient stabilizing boom and hence directly compete with gravity gradient stabilization, produce a varying disturbing torque which has a frequency in the vicinity of the poles of 1.5 revolutions per orbit and 3.0 revolutions per orbit at the equator, whereas gravity gradient stabilization calls for one revolution per orbit. Therefore, it is not surprising that all satellites employing gravity gradient stabilization and hysteresis damping by interaction with the earth's field demonstrate effective stabilization and damping until a libration half-angle of 5° to 15° is attained. Thereafter the oscillations continue unabated, varying in an obscurely complex fashion due to the differing frequencies of the several processes involved and the cross-coupling generally present. Errors in attitude stabilization of this magnitude are acceptable for some satellite missions, usually at the price of broader antenna patterns, reduced radio-frequency signal levels, excessive power consumption, etc. Examples of such missions are navigation and communications relaying. Other missions, such as optical reconnaissance of the earth and astronomy, are incompatible with poor attitude stabilization. Some of the practical engineering problems in the design of satellites are made more difficult or more uncertain by poor attitude control. Examples include solar-powered generating systems and thermal design. Clearly, there would be advantages in obtaining a better quality of attitude stabilization without the necessity of turning to gas jet reaction thrusters, horizon scanners, inertial platforms, etc.

The present invention provides a method and means for changing the rods after the initial damping phase so that their average magnetic moment does not perturb the satellite attitude during the later phase of small angle librations. The preferred embodiment of the method is to provide commandable means for imposing a magnetizing force on each rod such that the earth's field produces only slight and substantially invariant magnetic induction in the rods. In order that no net dipole is created which would compete with the attitude control provisions, such as gravity gradient stabilization, it is necessary that the artificially induced magnetism in the rods take the form of equal dipoles of opposing polarities or, alternatively, that any net dipole be reversed periodically with equal dwell time on opposite polarities and at a frequency high compared to the natural frequencies of the modes of oscillation of the satellite.

Figure 4:
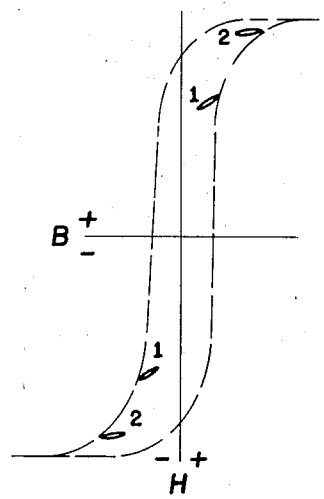
FIG. 4 is a diagram illustrating the combined effect of a local magnetic field plus the same variation in the earth's magnetic field as shown in FIG. 3.

The artificially induced magnetism in the rods limits the earth's field to causing loops to be traced as indicated in FIG. 4. It is evident that the area of the hysteresis loop, and consequently the amount of damping available, is markedly reduced in the process. Two steps of artificial induction are used to tailor the amount of damping retained to the libration angle remaining. Having reduced the residual angle, the second, larger step of artificially induced magnetism would then be commanded. The second step would leave enough damping to cope with non-magnetic disturbing torques, such as solar pressure. The two step operation is indicated as loops 1 and 2 in FIG. 4.

Figure 5:
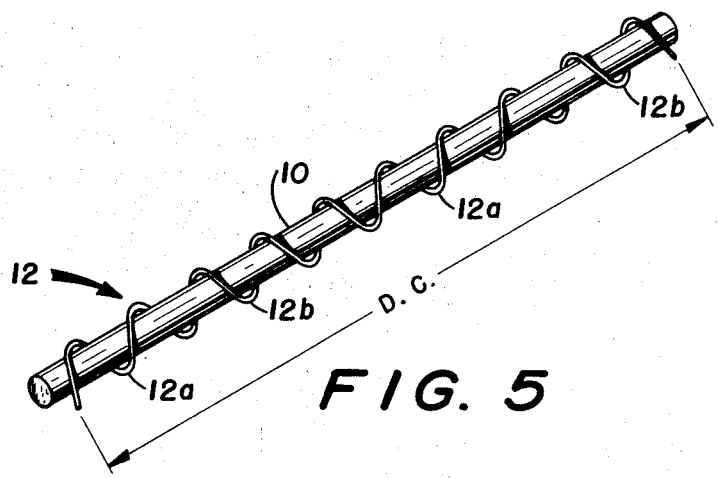
FIG. 5 is a schematic of a direct current winding on a hysteresis rod for controlling the incremental permeability of the rod.

Several embodiments of means useful to accomplish the present method are shown in FIGS. 5 through 9. FIG. 5 illustrates the most simple arrangement wherein a damping rod 10 composed of a magnetically permeable "lossy" material has a winding 12 of electrically conductive material wrapped therearound in sets 12a and 12b forming a symmetric pattern of left and right hand windings connected in series. Each set 12a and 12b of the windings 12 should have the same number of turns with the same spacing therebetween. The winding 12 is energized on command by a direct current source (not shown) to inductively magnetize the rod 10 without producing a net dipole moment. Thus, the hysteresis damping capability of the rod 10 is removed by the induced magnetic field within the rod. In effect, the electrically induced magnetizing force applied to the rod 10 is sufficiently larger than the maximum component of the earth's field so that the induced magnetism in the rod produced by the earth's field is negligibly small.

Figure 6:
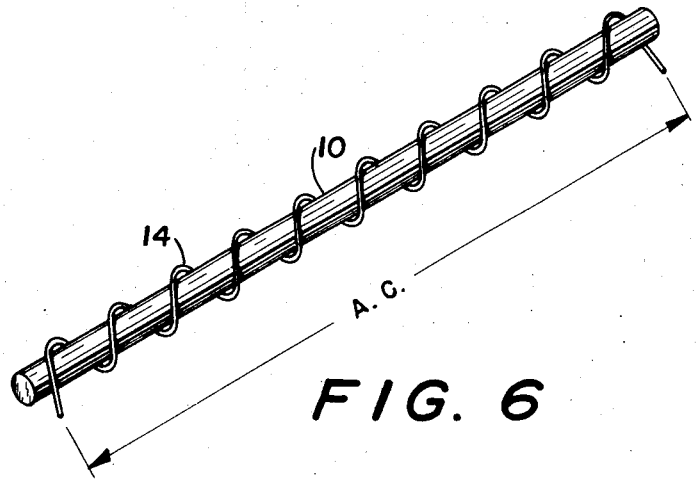
FIG. 6 is a schematic of an alternating current winding on a hysteresis rod for controlling the incremental permeability of the rod.
Figure 7:
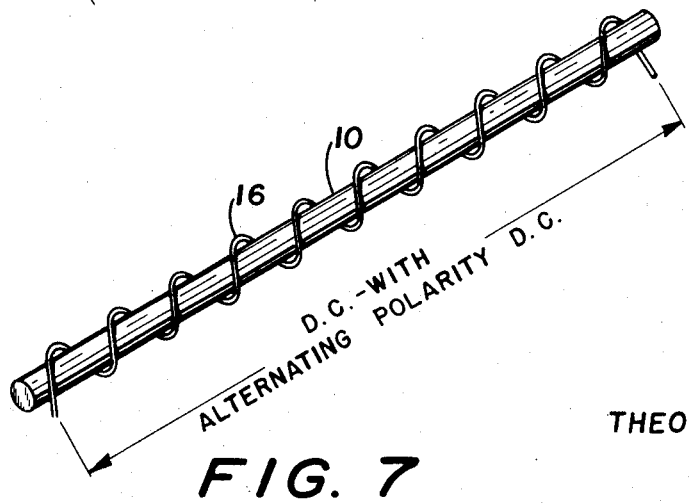
FIG. 7 is a schematic of a reversing direct current through a winding on a hysteresis rod for controlling the incremental permeability of the rod.

If alternating current is available in the satellite, an electrically conductive winding 14 having a single degree of rotation can be used on the rod 10, as shown in FIG. 6. On AC energization of the winding 14, the polarity is reversed at a frequency sufficiently greater than the natural frequency of the satellite so that the net dipole moment produced is essentially negligible.

The arrangement of FIG. 6 has the disadvantages of greater heat dissipation and power consumption than the direct current embodiment shown in FIG. 5. However, the arrangement shown in FIG. 7 avoids these disadvantages. Direct current is applied to a continuous winding 16 on the rod 10, the polarity being periodically reversed with an equal dwell time. The natural period of angular motion of a typical gravity gradient stabilized satellite is approximately one hour. Thus, if the current reversals are performed at least as frequently as every six minutes, the attitude of the satellite is not perturbed.

Figure 8:
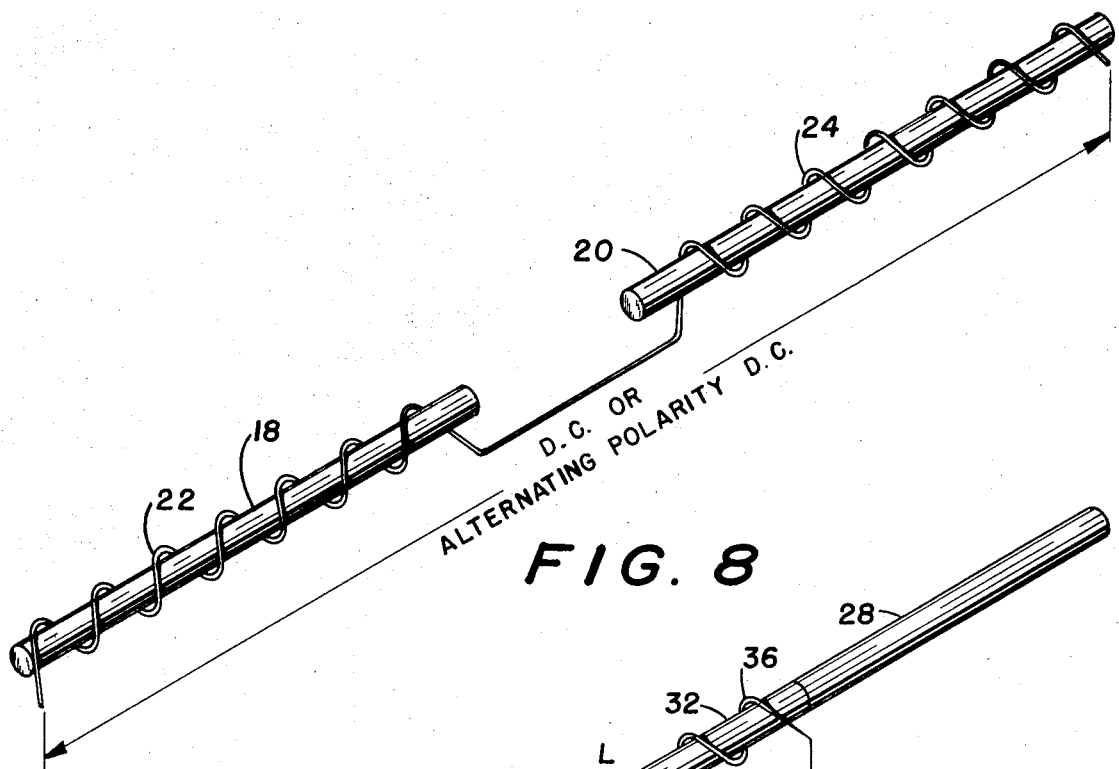
FIG. 8 is a schematic of a rod arrangement in a satellite for each damped axis of motion; and, FIG. 9 is a schematic of a controllable rod arrangement wherein cores at the ends of the rods are magnetizable through a capacitive circuit.

If the satellite contains two rods 18 and 20 for each damped axis of motion, the arrangement shown in FIG. 8 is advantageous. In this case two electrical windings 22 and 24 of the same number of turns are in series, the winding 22 being left-handed and the winding 24 being right-handed. As long as the magnetic properties of the rods 18 and 20 are identical, this arrangement provides a neutral magnetic dipole. If there is doubt regarding the rods remaining identical throughout the hazards of assembly, testing and launching, the DC polarity reversal arrangement described above and referenced to FIG. 7 can be employed as a protective measure. Since the missions of many satellites require an on-board timing system, the automatic switching function described as applicable to FIGS. 7 and 8 can be readily accomplished without significant penalty.

Figure 9:
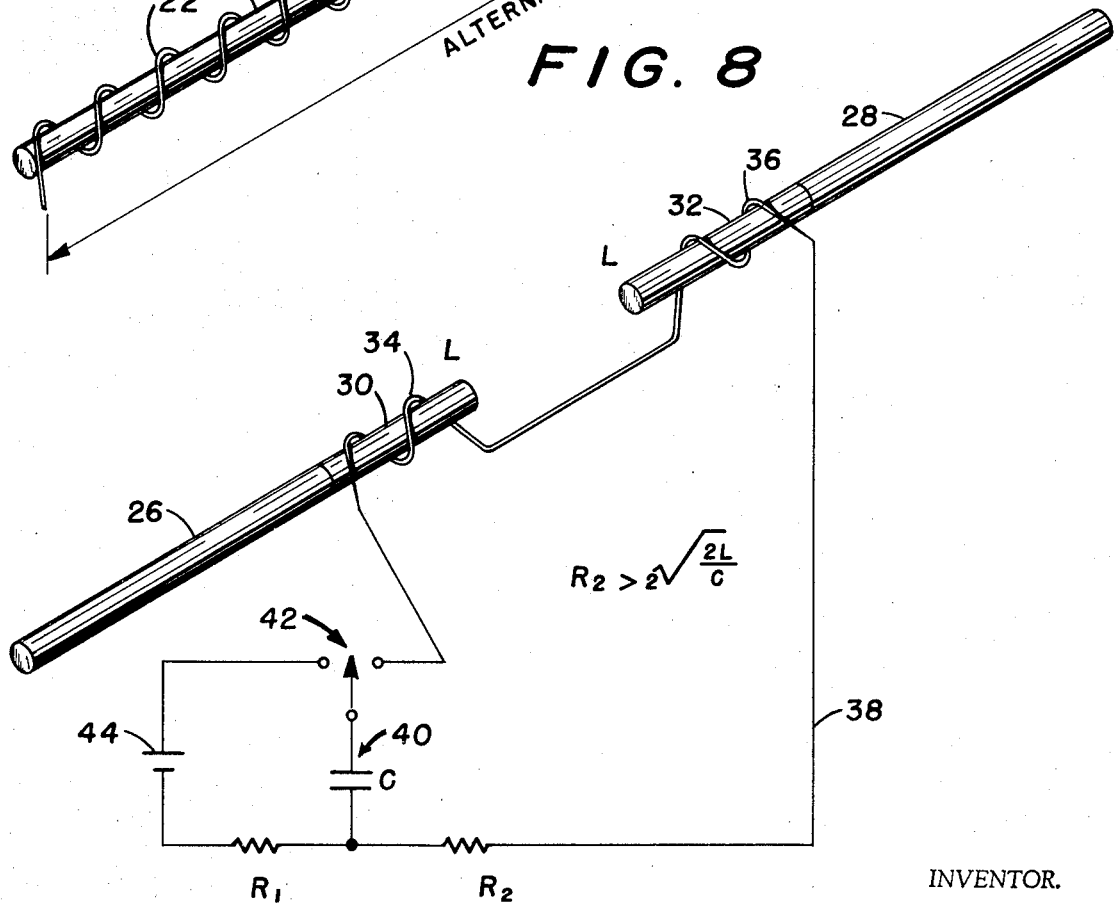

Tests of a representative satellite indicate that 50 milliwatts of power for each of four rods is adequate to operate any of the direct current arrangements described hereinabove. However, some satellites do not have this margin of power available continuously. In this case a chargeable permanent magnet can be employed. A possible arrangement is shown in FIG. 9. Controllable rods 26 and 28 have cores 30 and 32 disposed at and intimately contacting their corresponding inner ends, the cores being composed of a ferromagnetic material having good retentivity. Windings 34 and 36 of opposite sense are wound one each about the cores 30 and 32 and are connected in a circuit 38 which contains a capacitor 40, the circuit 38 being completed on command by a three-position switch 42. Prior to activation of the controllable rods 26 and 28, the capacitor 40 is charged and then disconnected from a power supply 44. When activation of the rods 26 and 28 is desired, the capacitor 40 is discharged on selective positioning of the switch 42 through the windings 34 and 36. The temporary induction field produced in the cores 30 and 32 permanently magnetizes said cores, the magnetic flux being then conducted into the rods 26 and 28. Cores of ferromagnetic material which are magnetizable in the manner described may also be disposed at both ends of each of the rods 26 and 28 to provide a lower value of B/H over the length of each of the rods for a given maximum value of H, thereby minimizing the magnetic dipole produced by the earth's magnetic field. The windings 34 and 36 preferably have opposite senses in order to avoid a net dipole from the combined effect of the two rod and magnetizable core assemblies. The arrangement shown in FIG. 9 requires a high degree of similarity in the magnetic properties of each pair of the rods and cores.

The arrangement shown in FIG. 10 may also be employed if the satellite contains two rods for each damped axis of motion. Rods 46 and 48 have electrical windings 50 and 52 disposed therearound, the windings 50 and 52 having the same number of turns and being in the same sense, i.e., being either "left-handed " or "right-handed." The windings 50 and 52 are connected in series to a source of D.C. current. As long as the magnetic properties of the rods 46 and 48 are identical, the arrangement described provides a neutral magnetic dipole. If there is doubt regarding the rods remaining identical throughout the hazards of assembly, testing and launching, the D.C. polarity reversal arrangement described above and referenced to FIG. 7 can be employed as a protective measure.

The means described hereinabove are representative of apparatus which may be used to practice the method of the invention, the purpose of the said method and means being to minimize pitch and yaw attitude perturbations. Since mechanical cross-coupling of the motions about three axes (pitch, yaw, and roll) is normally present, the reduction in attitude perturbation is afforded to the roll axis as well as to the pitch and yaw axes. Since shorted inductive winding damping is commonly employed in conjunction with magnetic hysteresis damping, shorting the several windings described herein in the period prior to controlling the hysteresis damping capability of the rods makes available "shorted coil" damping without additional mechanical complexity.

I claim:

1. In a gravity gradient stabilized satellite employing a magnetic hysteresis structure to damp relatively large oscillatory motion of the satellite, apparatus for eliminating low-order oscillations of said satellite due to residual dipole interaction of the magnetic hysteresis structure with the magnetic field of the earth, comprising
means for applying a magnetizing force to the magnetic hysteresis structure throughout said structure, thereby inducing a magnetic field in the structure of sufficient magnitude to minimize the influence of the magnetic field of the earth on the structure.

2. The apparatus of claim 1 wherein said means comprises
electrically conductive means disposed around the structure along the full length thereof, and
electrical means for producing a current in the electrically conductive means, thereby producing a magnetic field therein.

3. The apparatus of claim 2, and further comprising means to selectively control the production of electric current in the electrically conductive means.

4. The apparatus of claim 2, wherein said electrically conductive means comprises sets of electrically conductive windings disposed symmetrically around the structure, alternate sets of windings having opposite senses and being connected in series, and each set having the same number of turns therein and having the same spacing between the turns.

5. The apparatus of claim 4, wherein said electrical means comprises a source of direct current.

6. The apparatus of claim 2 wherein said electrical conductive means comprises a winding having a single degree of rotation disposed around the structure.

7. The apparatus of claim 6, wherein said electrical means comprises a source of alternating current having a frequency sufficiently greater than the natural frequency of the satellite so that the attitude of the satellite is not perturbed.

8. The apparatus of claim 6, wherein said electrical means comprises a source of direct current and further comprises means for periodically reversing the current within the winding, each period of applied current in both senses being equal in duration, the frequency of the current reversals being sufficiently greater than the natural frequency of the satellite so that the attitude of the satellite is not perturbed.

9. The apparatus of claim 2, wherein said hysteresis damping structure comprises at least two rods oriented with their longitudinal axes extending in the same direction, each of which is composed of a magnetically permeable hysteresis material; the electrically conductive means comprising a winding on each of the rods and extending the full length thereof, the windings being connected in series, the sense of the windings being opposite; and the current means comprising a source of direct current.

10. The apparatus of claim 2, wherein said hysteresis damping structure comprises at least two rods oriented with their longitudinal axes extending in the same direction, each of which is composed of a magnetically permeable hysteresis material; the electrically conductive means comprising a winding on each of the rods and extending the full length thereof, the windings being connected in series, the sense of the windings being identical; and the current means comprising a source of direct current such that the direction of the current flow through the respective windings is opposite.

11. The apparatus of claim 1, wherein the hysteresis damping structure comprises at least two rods, each of which is composed of a magnetically permeable hysteresis material, the means for applying a magnetizing force to the structure comprising,
a magnetizable core disposed contiguous to at least one end of each of the rods,
electrically conductive means disposed around each of the magnetizable cores, and
current means for producing an electric current in the electrically conductive means in order to induce a magnetic field in the cores, thus permanently magnetizing said cores.

12. The apparatus of claim 11, wherein said electrically conductive means comprise windings on the cores, the windings for any two cores being of opposite sense and being connected in series.

13. The apparatus of claim 12, wherein said current means comprises a circuit having
a capacitor,
means for charging the capacitor, and
means for connecting the capacitor to said windings to produce current in said windings.

14. A method for controlling the incremental permeability of a hysteresis damping structure provided aboard an orbiting satellite to damp relatively large oscillatory motion of the satellite, the method comprising the step of inducing a magnetic field throughout the structure of sufficient magnitude to minimize the influence of the magnetic field of the earth on the structure.

15. A method for controlling the incremental permeability of a hysteresis rod provided aboard an orbiting satellite to damp relatively large oscillatory motion of the satellite, the method comprising,
disposing an electrically conductive winding around the rod along the full length thereof, and
energizing the winding by a source of electric current to induce a magnetic field in the rod of sufficient magnitude to minimize the influence of the magnetic field of the earth on the rod.

* * * * *